US012700238B1

(12) United States Patent
Chen et al.

(10) Patent No.: US 12,700,238 B1
(45) Date of Patent: Aug. 4, 2026

(54) ENSEMBLE OF MACHINE LEARNING MODELS FOR AUTOMATIC SCENE CHANGE DETECTION

(71) Applicant: Amazon Technologies, Inc., Seattle, WA (US)

(72) Inventors: Shixing Chen, Seattle, WA (US); Muhammad Raffay Hamid, Seattle, WA (US); Vimal Bhat, Redmond, WA (US); Shiva Krishnamurthy, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 118 days.

(21) Appl. No.: 18/456,703

(22) Filed: Aug. 28, 2023

Related U.S. Application Data

(63) Continuation of application No. 17/107,514, filed on Nov. 30, 2020, now Pat. No. 11,776,273.

(51) Int. Cl.
G06V 20/40 (2022.01)
G06F 18/213 (2023.01)
(Continued)

(52) U.S. Cl.
CPC ............ G06V 20/49 (2022.01); G06F 18/213 (2023.01); G06N 5/04 (2013.01); G06N 20/20 (2019.01); G10L 25/78 (2013.01)

(58) Field of Classification Search
CPC ........ G06V 20/49; G06F 18/213; G06N 5/04; G06N 20/20; G10L 25/78
(Continued)

(56) References Cited

U.S. PATENT DOCUMENTS 10,701,394 B1 * 6/2020 Caballero ............ H04N 19/577
10,902,616 B2 1/2021 Brown et al.
(Continued)

FOREIGN PATENT DOCUMENTS

CA 3130573 A1 8/2020
CA 3155314 A1 * 5/2021 ............. G11B 27/28
(Continued)

OTHER PUBLICATIONS

Carreira et al., "Quo Vadis, Action Recognition? A New Model and the Kinetics Dataset", In Proceedings of the IEEE Conference on Computer Vision and Pattern Recognition, Feb. 12, 2018, pp. 1-10.
(Continued)

*Primary Examiner* — Mahendra R Patel
(74) *Attorney, Agent, or Firm* — NICHOLSON DE VOS WEBSTER & ELLIOTT LLP

(57) ABSTRACT

Techniques for automatic scene change detection are described. As one example, a computer-implemented method includes receiving a request to train an ensemble of machine learning models on a training dataset of videos having labels that indicate scene changes to detect a scene change in a video, partitioning each video file of the training dataset of videos into a plurality of shots, training the ensemble of machine learning models into a trained ensemble of machine learning models based at least in part on the plurality of shots of the training dataset of videos and the labels that indicate scene changes, receiving an inference request for an input video, partitioning the input video into a plurality of shots, generating, by the trained ensemble of machine learning models, an inference of one or more scene changes in the input video based at least in part on the plurality of shots of the input video, and transmitting the inference to a client application or to a storage location.

18 Claims, 11 Drawing Sheets

(51) Int. Cl.

| | |
|---|---|
| *G06N 5/04* | (2023.01) |
| *G06N 20/20* | (2019.01) |
| *G10L 25/78* | (2013.01) |

(58) Field of Classification Search
USPC ........................................................ 382/224
See application file for complete search history.

(56) References Cited

U.S. PATENT DOCUMENTS

| | | | |
|---|---|---|---|
| 11,526,698 B2 | 12/2022 | Lee et al. | |
| 11,586,902 B1 | 2/2023 | Sather et al. | |
| 11,640,529 B2 | 5/2023 | Payne et al. | |
| 2016/0337705 A1* | 11/2016 | Jones et al. .... | H04N 21/234381 |
| 2017/0103264 A1 | 4/2017 | Javan et al. | |
| 2017/0124400 A1 | 5/2017 | Yehezkel et al. | |
| 2018/0139458 A1* | 5/2018 | Wang .................... | G06T 3/4053 |
| 2019/0147105 A1* | 5/2019 | Chu et al. ............. | G06V 10/82 |
| | | | 386/241 |
| 2019/0163977 A1* | 5/2019 | Chen ...................... | G06N 3/092 |
| 2019/0294927 A1 | 9/2019 | Guttmann | |
| 2019/0311202 A1* | 10/2019 | Lee et al. ................ | G06T 9/002 |
| 2019/0354765 A1 | 11/2019 | Chan et al. | |
| 2020/0090001 A1* | 3/2020 | Zargahi et al. ........ | G06V 10/96 |
| 2020/0134316 A1* | 4/2020 | Krishnamurthy ....... | G06F 16/65 |
| 2020/0193163 A1* | 6/2020 | Chang ................ | H04N 21/4662 |
| 2020/0293783 A1 | 9/2020 | Ramaswamy et al. | |
| 2020/0304755 A1* | 9/2020 | Narayan ............ | H04N 21/2335 |
| 2020/0394458 A1 | 12/2020 | Yu et al. | |
| 2021/0004589 A1* | 1/2021 | Turkelson ........ | G06V 30/19173 |
| 2021/0049468 A1 | 2/2021 | Karras et al. | |
| 2021/0064965 A1 | 3/2021 | Pardeshi et al. | |
| 2021/0073944 A1 | 3/2021 | Liu et al. | |
| 2021/0089779 A1* | 3/2021 | Chan .................... | H04N 21/472 |
| 2021/0117728 A1 | 4/2021 | Lee et al. | |
| 2021/0132688 A1 | 5/2021 | Kim et al. | |
| 2021/0142066 A1* | 5/2021 | Jayaram ................. | G02B 3/005 |
| 2021/0142160 A1 | 5/2021 | Mohseni et al. | |
| 2021/0192748 A1* | 6/2021 | Morales Morales .. | G06N 3/044 |
| 2021/0192756 A1* | 6/2021 | Huang ................. | G06V 40/161 |
| 2022/0021716 A1 | 1/2022 | Nagendran et al. | |
| 2022/0067386 A1* | 3/2022 | Rotman ................. | G06V 20/49 |
| 2022/0101112 A1* | 3/2022 | Brown ................. | G06N 3/0895 |

FOREIGN PATENT DOCUMENTS

| | | | | | |
|---|---|---|---|---|---|
| CN | 111566664 A | * | 8/2020 | ............ | G08G 1/166 |
| WO | WO-2018083668 A1 | * | 5/2018 | ............ | G06V 10/82 |
| WO | 2018/154494 A1 | | 8/2018 | | |
| WO | 2018/217635 A1 | | 11/2018 | | |
| WO | 2020/012069 A1 | | 1/2020 | | |
| WO | 2020/068140 A1 | | 4/2020 | | |
| WO | 2020/068784 A1 | | 4/2020 | | |
| WO | 2021/041078 A1 | | 3/2021 | | |
| WO | 2021/096776 A1 | | 5/2021 | | |
| WO | 2021/105157 A1 | | 6/2021 | | |
| WO | WO-2022023806 A1 | * | 2/2022 | ........... | G06F 18/213 |

OTHER PUBLICATIONS

Deng et al., "ImageNet: A Large-Scale Hierarchical Image Database", In Proceedings of the IEEE Conference on Computer Vision and Pattern Recognition, Jun. 2009, 9 pages.

Hara et al., "Can Spatiotemporal 3D CNNs Retrace the History of 2D CNNs and ImageNet?", In Proceedings of the IEEE Conference on Computer Vision and Pattern Recognition, Apr. 2, 2018, 10 pages.

He et al., "Momentum Contrast for Unsupervised Visual Representation Learning", Facebook AI Research (FAIR), Mar. 23, 2020, 12 pages.

He et al., "Deep Residual Learning for Image Recognition", In Proceedings of the IEEE Conference on Computer Vision and Pattern Recognition, Dec. 10, 2015, pp. 1-12.

Hershey et al., "CNN Architectures for Large-Scale Audio Classification", In Proceedings of the IEEE International Conference on Acoustics, Speech and Signal Processing, Jan. 10, 2017, 5 pages.

Non-Final Office Action, U.S. Appl. No. 17/236,688, Oct. 5, 2022, 6 pages.

Notice of Allowance, U.S. Appl. No. 17/107,514, Jun. 7, 2023, 25 pages.

Notice of Allowance, U.S. Appl. No. 17/236,688, Apr. 28, 2023, 5 pages.

Notice of Allowance, U.S. Appl. No. 17/236,688, Aug. 3, 2023, 2 pages.

Rao et al., "A Local-to-Global Approach to Multi-modal Movie Scene Segmentation", CVPR 2020, Computer Vision Foundation, 2020, pp. 10146-10155.

* cited by examiner

500

RECEIVING A REQUEST TO TRAIN AN ENSEMBLE OF MACHINE LEARNING MODELS, ON A TRAINING DATASET OF VIDEOS HAVING LABELS THAT INDICATE SCENE CHANGES, TO DETECT A SCENE CHANGE IN A VIDEO
502

PARTITIONING EACH VIDEO FILE OF THE TRAINING DATASET OF VIDEOS INTO A PLURALITY OF SHOTS
504

TRAINING THE ENSEMBLE OF MACHINE LEARNING MODELS INTO A TRAINED ENSEMBLE OF MACHINE LEARNING MODELS BASED AT LEAST IN PART ON THE PLURALITY OF SHOTS OF THE TRAINING DATASET OF VIDEOS AND THE LABELS THAT INDICATE SCENE CHANGES
506

RECEIVING AN INFERENCE REQUEST FOR AN INPUT VIDEO
508

PARTITIONING THE INPUT VIDEO INTO A PLURALITY OF SHOTS
510

GENERATING, BY THE TRAINED ENSEMBLE OF MACHINE LEARNING MODELS, AN INFERENCE OF ONE OR MORE SCENE CHANGES IN THE INPUT VIDEO BASED AT LEAST IN PART ON THE PLURALITY OF SHOTS OF THE INPUT VIDEO
512

TRANSMITTING THE INFERENCE TO A CLIENT APPLICATION OR TO A STORAGE LOCATION
514

*FIG. 5*

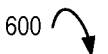

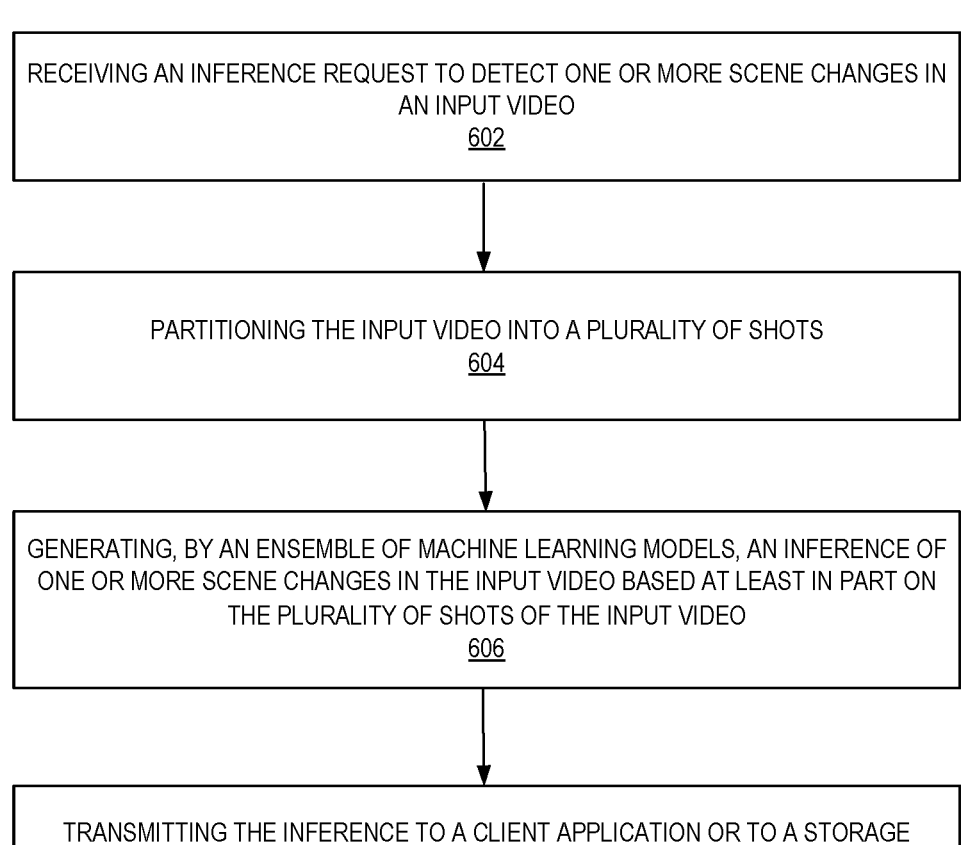

RECEIVING AN INFERENCE REQUEST TO DETECT ONE OR MORE SCENE CHANGES IN AN INPUT VIDEO
602

PARTITIONING THE INPUT VIDEO INTO A PLURALITY OF SHOTS
604

GENERATING, BY AN ENSEMBLE OF MACHINE LEARNING MODELS, AN INFERENCE OF ONE OR MORE SCENE CHANGES IN THE INPUT VIDEO BASED AT LEAST IN PART ON THE PLURALITY OF SHOTS OF THE INPUT VIDEO
606

TRANSMITTING THE INFERENCE TO A CLIENT APPLICATION OR TO A STORAGE LOCATION
608

*FIG. 6*

ENSEMBLE OF MACHINE LEARNING MODELS FOR AUTOMATIC SCENE CHANGE DETECTION

CROSS-REFERENCE TO RELATED APPLICATIONS

This application is a continuation of U.S. patent application Ser. No. 17/107,514 filed Nov. 30, 2020, which is incorporated by reference herein in its entirety.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the drawings, in which:

FIG. 5 is a flow diagram illustrating operations of a method for training and usage of an ensemble of machine learning models to detect a scene change according to some embodiments.

FIG. 6 is a flow diagram illustrating operations of a method for detecting a scene change with an ensemble of machine learning models according to some embodiments.

DETAILED DESCRIPTION

Figure 1:
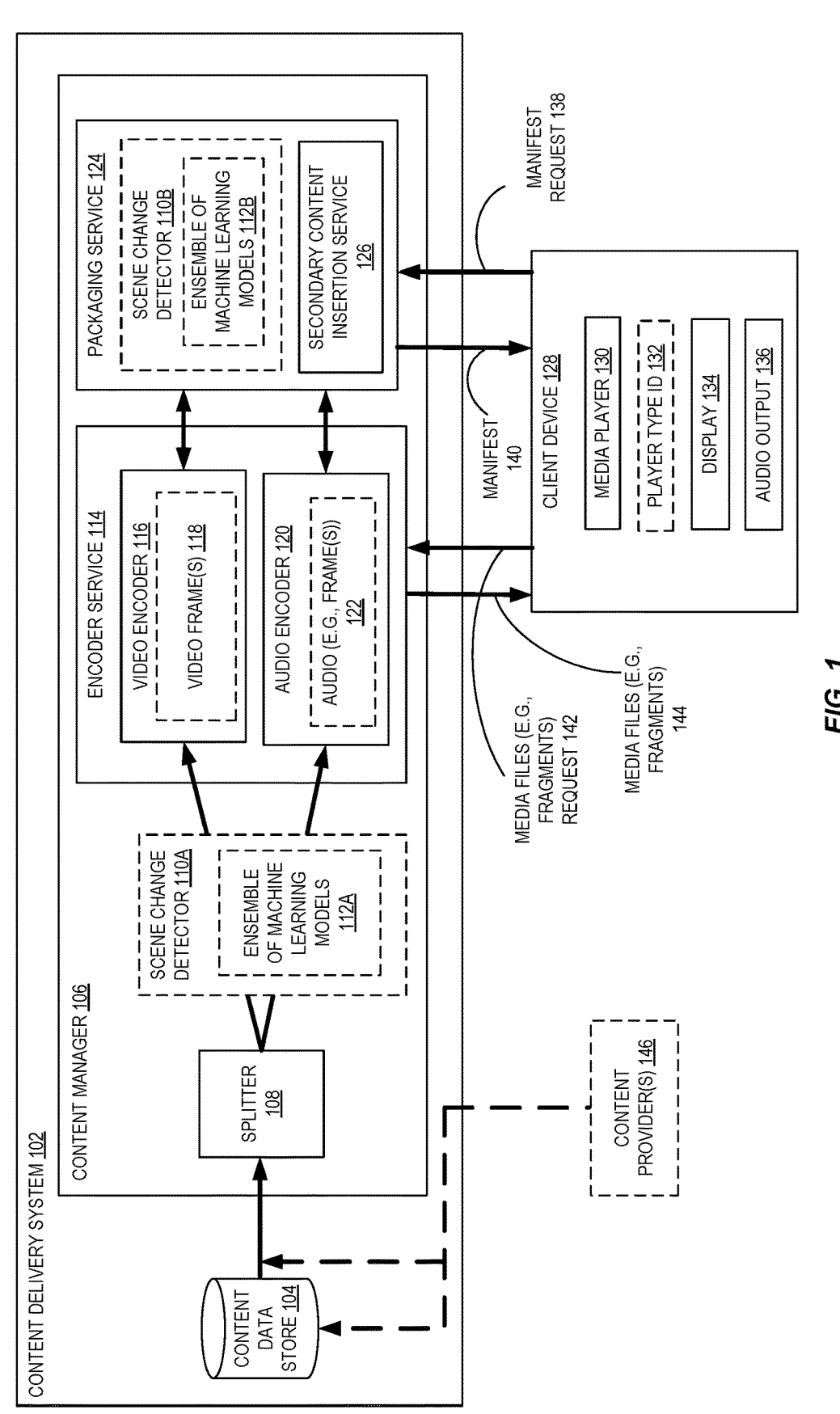
FIG. 1 is a diagram illustrating an environment including a content delivery system having a scene change detector and a packaging service that includes a secondary content insertion service according to some embodiments.

Various embodiments of methods, apparatuses, systems, and non-transitory computer-readable storage media for (e.g., multi-modal) scene change detection are described. According to some embodiments, a scene change detection service detects one or more scene changes (e.g., scene boundaries) in multimedia titles (e.g., video with corresponding audio). In certain embodiments, an ensemble of machine learning models is trained and used to generate an inference of one or more scene changes in a title. The inference may be used to (e.g., automatically) generate one or more cue-points based on an inferred scene change (e.g., scene boundary), for example, for insertion of secondary content at a cue-point.

In certain embodiments (e.g., in filmmaking and video production), the term "shot" may generally refer to a contiguous sequence of frames recorded (e.g., by a single camera) over an uninterrupted period of time, and the term "scene" may generally refer to a set of shots filmed in a particular context (e.g., the action in a single location and continuous time).

As a fundamental unit, a scene plays a critical role to semantically understand the content in titles (e.g., videos with corresponding audio) in certain embodiments. Certain embodiments herein are directed to scene change detection (SCD), and more particularly, to automatically detecting (e.g., the timestamps in titles) where a scene change happens. For numerous content delivery service use cases, scene change detection is a key problem that can have huge impact on various practical applications. For example, for certain (e.g., advertising-supported) videos, it may be desirable to insert advertisement(s) at one or more cue points detected as scene changes to provide minimal disruption for viewers (e.g., customers). By cutting full-length titles into clips constrained by scene boundaries, promotional video assets with engaging information can be generated for customers. For example, it may be desirable to display certain additional information about the title while viewing the title. This additional information may include one or more of cast (e.g., actor biographies) and characters, trivia, bonus videos and photos, music being played in the title, etc. In certain embodiments, this additional information is displayed on a scene granularity, e.g., such that scene change detection can be directly applied to determine scene boundaries where synopsis can be further generated for each identified scene. However, due to the lack of a clear definition and sufficient training dataset, scene change detection is still an unsolved problem subject to ongoing research. Further, video analysis tasks may rely heavily on computation resources to get reasonable results, and thus performing efficient procedures are critical and necessary in certain embodiments. To this end, embodiments herein utilize a (e.g., multi-modality) ensemble of (e.g., visual and aural) machine learning models (e.g., models based on deep neural networks) to provide an efficient and accurate way for (e.g., automatic) scene change detection.

FIG. 1 is a diagram illustrating an environment 100 including a content delivery system 102 having a scene change detector (110A and/or 110B) and a packaging service 124 that includes a secondary content insertion service 126 according to some embodiments. The depicted content delivery system 102 includes a content data store 104, which may be implemented in one or more data centers. As one example, a media file (e.g., a video with corresponding audio) that is to be encoded is accessed from the content data store 104 by content manager 106. In one embodiment, the video encoder 116 of the encoder service 114 is to encode the video into a plurality of video representations (e.g., video frames 118) and/or the audio encoder 120 of the encoder service 114 is to encode the audio (e.g., corresponding to the video of a single title) into a plurality of audio representations (e.g., audio 122 (e.g., audio frames)). For example, with splitter 108 splitting the input file into a video portion and audio portion for servicing by video encoder 116 and audio encoder 120, respectively.

The encoded video 118 (e.g., and audio 122) may then be utilized by packaging service to package the content for delivery to a client device 128, e.g., for playback. Certain embodiments herein generate a manifest of the available video representations (e.g., stored in content delivery system 102) and form a superset manifest. In these embodiments, the packaging service 124 then uses the superset manifest to generate a manifest identifying a proper subset of video and audio representations for a particular client device 128 (e.g., based on the client's media player 130 (e.g., determined from its type ID value 132), display 134 resolution, audio output 136 capabilities, and/or available bandwidth). In certain embodiments, the content is stored in the content delivery system 102 in two parts: (i) the manifest of all available media representations (e.g., their URL addresses and, optionally, other characteristics, and (ii) the media representations (e.g., stream of fragments) in a single (e.g., container) or multiple files. In one embodiment, a client device is to read (or store) a manifest 140 (e.g., sent in response to manifest request 138) before the client device may make a request 142 for the media from that manifest, and thus access media files 144 (e.g., encoded video and corresponding encoded audio).

Optionally, content provider(s) 146 may be included to provide a video (e.g., and audio) file, for example, directly to the content manager 106 without utilizing the content data store 104 or into storage in content data store 104.

In certain embodiments, secondary content insertion service 126 adds secondary content (e.g., advertisement(s), additional information about the multimedia title, etc.) into a main content. In one embodiment, encoder service 114 is to encode both the main content and secondary content, e.g., and the secondary content insertion service 126 is to insert the secondary content into the main content. Content manager 106 (e.g., secondary content insertion service 126) may utilize scene changes to insert content based at least in part on those scene change(s), e.g., scene boundaries. For example, Embodiments herein include a scene change detector (e.g., scene change detection service), for example, scene change detector 110A for detecting a scene change on a (e.g., video) file before encoding and/or scene change detector 110B for detecting a scene change on the (e.g., video) file after encoding. Certain embodiments utilize an ensemble of machine learning models to infer one or more scene changes in a (e.g., video) file, e.g., ensemble of machine learning models 112A for scene change detector 110A and/or ensemble of machine learning models 112B for scene change detector 110B. Ensemble of machine learning models may utilize one or more (e.g., a plurality of) machine learning models trained for video (e.g., scene change) detection tasks and/or one or more (e.g., a plurality of) machine learning models trained for audio (e.g., scene change) detection tasks (e.g., as discussed below in reference to FIGS. 2-3).

Figure 2:
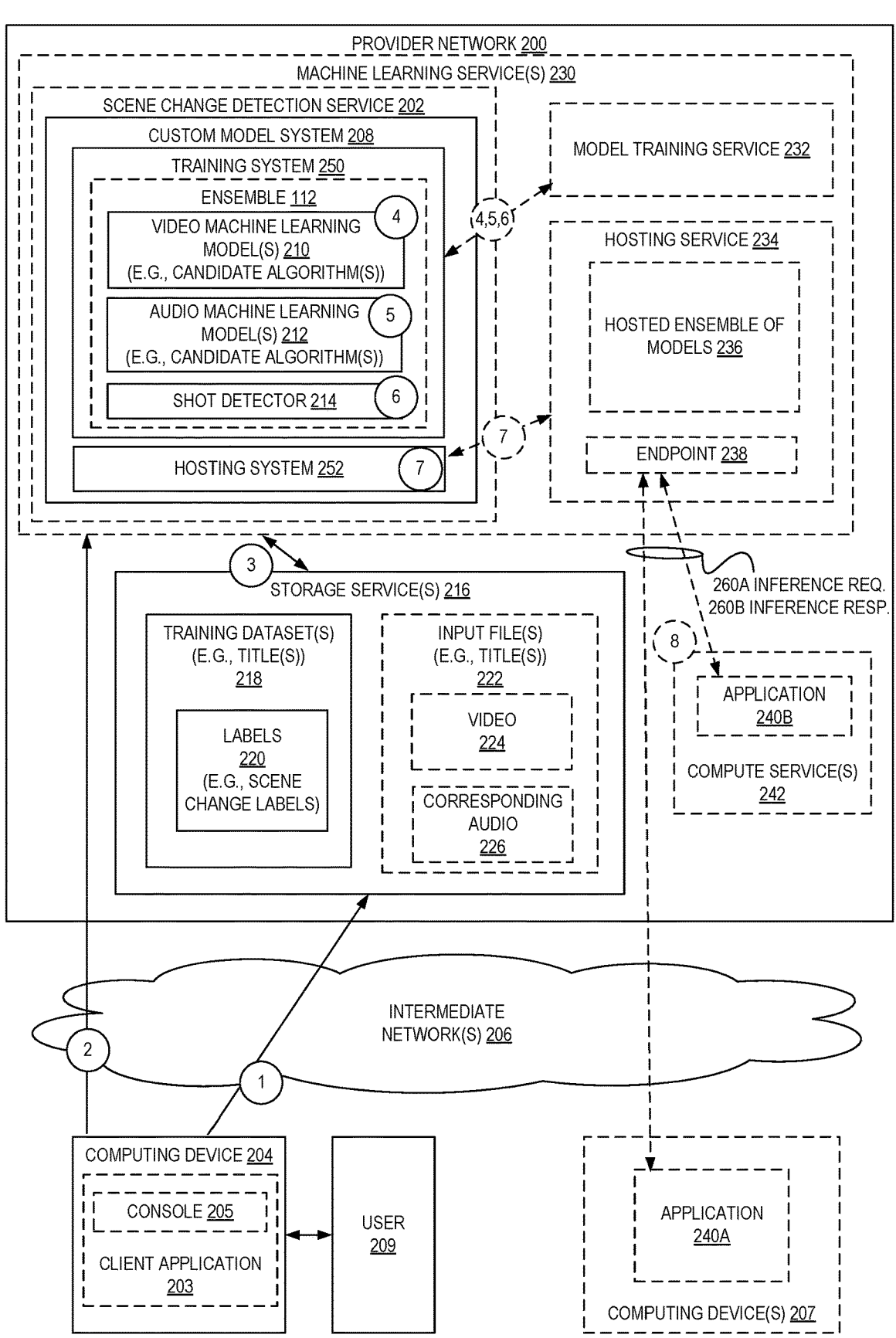
FIG. 2 is a diagram illustrating an environment for creating, training, and using an ensemble of machine learning models according to some embodiments.

FIG. 2 is a diagram illustrating an environment for creating, training, and using an ensemble of machine learning models according to some embodiments. FIG. 2 includes a scene change detection service 202, one or more storage services 216, one or more machine learning services 230, and one or more compute services 242 implemented within a multi-tenant provider network 200. Each of the scene change detection service 202, one or more storage services 216, one or more machine learning services 230, one or more model training services 232, one or more hosting services 234, and one or more compute services 242 may be implemented via software, hardware, or a combination of both, and may be implemented in a distributed manner using multiple different computing devices.

A provider network 200 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 242), a storage service 216 that can store data objects, etc. The users (or "customers") of provider networks 200 may utilize one or more user accounts that are associated with a customer account, though these terms may be used somewhat interchangeably depending upon the context of use. Users may interact with a provider network 200 across one or more intermediate networks 206 (e.g., the internet) via one or more interface(s), such as through use of application programming interface (API) calls, via a console 205 implemented as a website or application, etc. The interface(s) may be part of, or serve as a front-end to, a control plane of the provider network 200 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 200 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code-typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 200 by an on-demand code execution service (which may be one of compute service(s) 242) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions (e.g., as an application 240B) that can be executed on demand, without requiring the user to maintain dedicated infrastructure to execute the serverless function. Instead, the serverless functions can be executed on demand using resources maintained by the provider network 200. In some embodiments, these resources may be maintained in a "ready" state (e.g., having a pre-initialized runtime environment configured to execute the serverless functions), allowing the serverless functions to be executed in near real-time.

The scene change detection service 202, in some embodiments, is a machine learning powered service that makes it easy for users to detect one or more scene changes in an input video file, e.g., to infer the probability that a particular boundary (e.g., shot boundary) is a scene boundary.

The training system 250, for example, may enable users to generate an ensemble 112 of one or more video machine learning models 210 and/or one or more audio machine learning models 212 that output feature vectors for an input (for example, of an video 224 (e.g., and its corresponding audio 226), e.g., from input file(s) 222. The training system 250, for example, may enable users to generate an classifier model 212 that outputs a value or other indication for a classification task from an input of a file 222 (for example, classification vectors, e.g., the value being a confidence value that an identified file includes a feature (e.g., object) (e.g., of a class as discussed herein) that is being searched for in the file).

Embodiments herein allow a customer to create an ensemble 112 of one or more video machine learning models 210 and/or one or more audio machine learning models 212 by supplying a training dataset 218 (e.g., including labels 220 that indicate one or more scene changes). In certain embodiments, trained ensemble 112 allow customers/users to infer one or more scene changes, e.g., as indicated by a probability that a certain time (e.g., of a shot boundary) is a scene change.

In some embodiments, the scene change detection service 202—via use of a custom model system 208—allows users to build and use trained ensemble 112 of video model(s) 210 and audio model(s) 212.

At a high level, machine learning may include two major components that are required to be put in place in order to expose advertised functionality to the customer: (i) training and (ii) inference. Training may include the following responsibilities: training data analysis; data split (training, evaluating (e.g., development or validation), and/or testing data); model selection; model training; model evaluation; and status reporting. Inference may include the following responsibilities: model loading and hosting; and inference (e.g., synchronous and batch).

Training may include training a candidate algorithm into a video machine learning model 210 and/or an audio machine learning model 212 and respective configurations (e.g., coefficients and/or hyperparameters). Training may perform a grid search over the matrix of experiments (e.g., defined upfront) in search for the model and its parameters (e.g., hyperparameters) that performs best on the given dataset.

Thus, a user 209 may provide or otherwise identify data 218 (e.g., with labels 220) for use in creating a custom model. For example, as shown at circle (1), the user 209 may utilize a client application 203 executed by a computing device 204 (e.g., a web-application implementing a console 205 for the provider network 200, a standalone application, another web-application of another entity that utilizes the classification service 202 as a part of its backend, a database or mixed-SQL environment, etc.) to cause the computing device 204 to upload the data 218 to a storage location (e.g., provided by a storage service 216 such as an object storage service of a provider network 200).

The data 218 may be a columnar dataset that includes rows (or entries) of data values, where the data values may be arranged according to one or more columns (or attributes) and may be of a same datatype (e.g., one storing text). In some cases, the data 218 includes headings or other metadata describing names or datatypes of the columns, though in some cases this metadata may not exist. For example, some or all of the data 218 may have been provided by a user as a plaintext file (e.g., a comma-separated values (CSV) or tab-separated values (TSV) file), an exported database table or structure, an application-specific file such as a spreadsheet, etc.

For example, when a user 209 desires to train a video machine learning model 210 (e.g., and an audio machine learning model 212), this file (or files) may include labels corresponding to the file (e.g., video and audio), e.g., with a label indicating that a scene change is to be detected.

Thereafter, at circle (2) the computing device 204 may issue one or more requests (e.g., API calls) to the machine learning service 230 that indicate the user's 209 desire to train one or more algorithms into one or more video machine learning models 210 and/or one or more audio machine learning models 212. The request may be of a type that identifies which type of model(s) are to be created or identifies that the machine learning service 230 itself is to identify the candidate video model(s) 210 and/or candidate audio models 212. The request may also include one or more of an identifier of a storage location or locations storing the data 218 (e.g., an identifier of the labels 220), which may identify a storage location (e.g., via a Uniform Resource Locator (URL), a bucket/folder identifier, etc.) within the provider network 200 (e.g., as offered by a storage service 216) or external to the provider network 200, a format identifier of the data 218, a language identifier of the language of the labels 220, etc. In some embodiments, the request includes an identifier (e.g., from the user 209) of the candidate algorithm(s) 210/112 themselves within the request.

Responsive to receipt of the request, the custom model system 208 of the machine learning service 230 is invoked and begins operations for training the corresponding type of model. For example, the custom model system 208 may identify what type of model is to be trained (e.g., via analyzing the method call associated with the request), the storage location(s) associated with the data 218 (e.g., labels 220), etc. Thus, the custom model system 208 may retrieve any stored data 218 elements as shown at circle (3), which may be from a storage location within the provider network 200 or external to the provider network 200.

In some embodiments, the training (at circle (4)) of the video machine learning model(s) 210 includes performing (at optional, dotted circle (4)) by training service 232 of machine learning service 230 a particular training job (e.g., hyperparameter optimization tuning job), or the like. In some embodiments, the training (at circle (5)) (e.g., on the same title(s) as the video machine learning model(s) were trained) of the audio machine learning model(s) 210 includes performing (at optional, dotted circle (5)) by training service 232 of machine learning service 230 a particular training job (e.g., hyperparameter optimization tuning job), or the like. In some embodiments, a shot detector 214 is used to partition each (e.g., video) file into a plurality of shots. In one embodiment, the shot detector 214 is a machine learning model trained to infer shot boundaries in the (e.g., video) file. In one embodiment, shot detector 214 is to detect that the content of one frame is different enough from the next frame, such that it can be inferred that a shot transition exists between them.

In some embodiments, the hosting system 252 (at circle (7)) of the custom model system 208 may make use (at optional, dotted circle (7)) of a hosting service 234 of a machine learning service 230 to deploy a model as a hosted model 236 in association with an endpoint 238 that can receive inference requests from client applications 240A and/or 240B at circle (8), provide the inference requests 260A to the associated hosted model(s) 236, and provide inference results 260B (e.g., a prediction, including, but not limited to, predicted scene change (e.g., scene boundary)) back to applications 240A and/or 240B, which may be executed by one or more computing devices 207 outside of the provider network 200 or by one or more computing devices of a compute service 242 (e.g., hardware virtualization service, serverless code execution service, etc.) within the provider network 200. Inference results 260B may be displayed to a user (e.g., in a graphical user interface of the application) and/or exported as a data structure (e.g., in a selected format).

Figure 3:
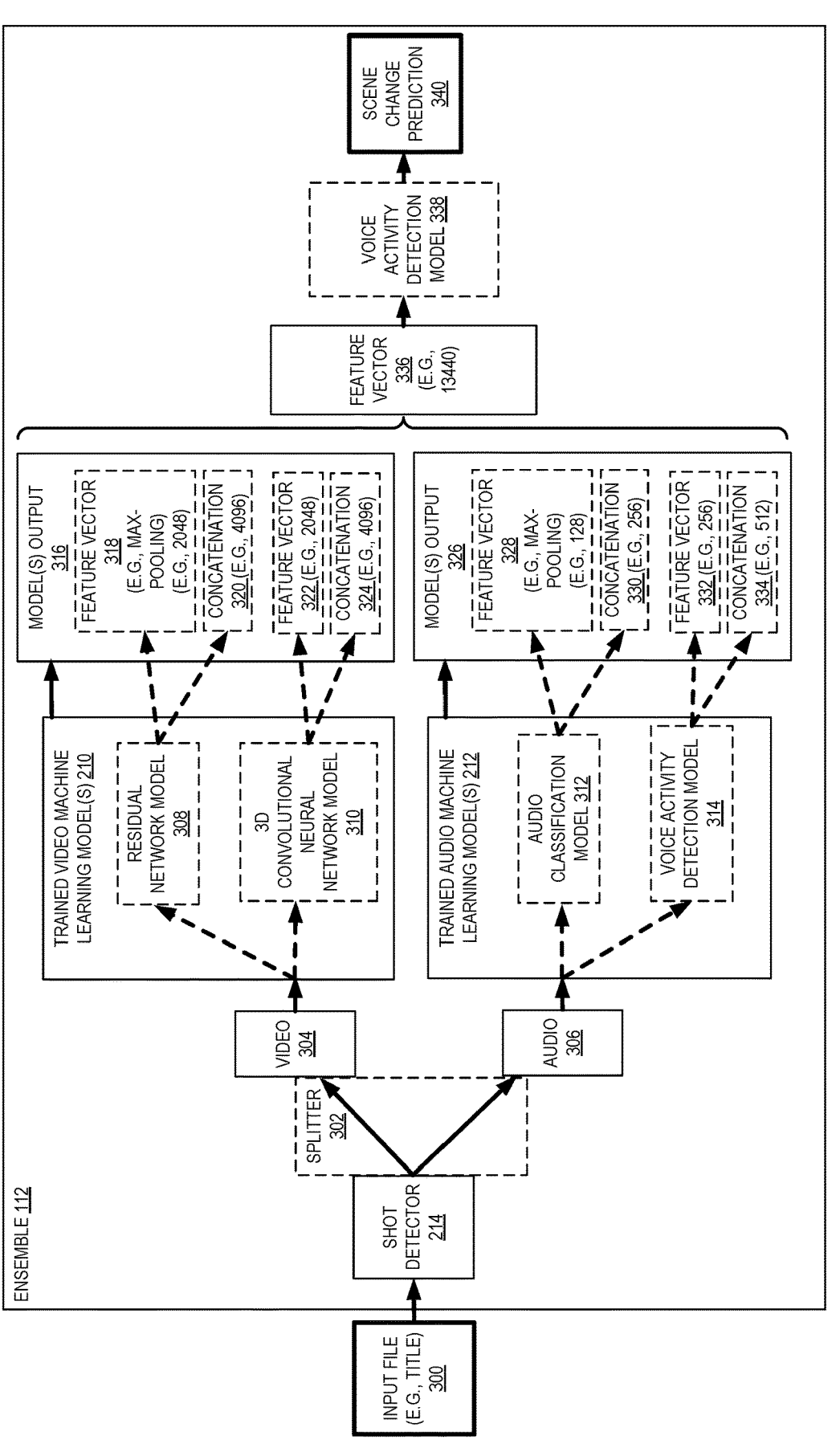
FIG. 3 is a diagram illustrating an ensemble of machine learning models according to some embodiments.

FIG. 3 is a diagram illustrating an ensemble 112 of machine learning models according to some embodiments. In one embodiment, ensemble 112 includes one or more trained video machine learning models 210 and one or more trained audio machine learning models 212. In certain embodiments, ensemble 112 is to receive an input file 300 (e.g., title) from training dataset 218 along with label(s) that indicate one or more scene changes during the training of the ensemble. In certain embodiments, trained ensemble 112 is to receive an input file 300 (e.g., title) from input file 222 (e.g., but without label(s) that indicate one or more scene changes) during the use of the trained ensemble 112.

FIG. 3 demonstrates a general pipeline of one embodiment of ensemble 112. In certain embodiments, a (e.g., full-length) title in input 300 and shot detection (e.g., via a shot detection algorithm) is performed on the input 300 to infer each shot of a plurality of shots of the input 300, e.g., where scene change points are a subset of shot change points. In certain embodiments, the input 300 is then split by splitter 302 into visual and audio modalities in the form of video 304 (e.g., image frames) and audio 306 (e.g., audio tracks), respectively. In certain embodiments, each modality has two networks pretrained on different datasets for feature extraction. In certain embodiments, all features (e.g., feature vectors) are combined (e.g., by a compression (e.g., maximum-pooling) operation and/or concatenation) to form the final feature vectors predicting scene changes.

In certain embodiments, video 304 is sent (e.g., in parallel) to a residual network (ResNet) model 308 trained to extract video features that indicate a scene change and a three-dimensional (3D) convolutional neural network model 310 (e.g., ResNeXt model) trained (e.g., on a different training dataset than model 308 was trained with) to extract video features that indicate a scene change. In one embodiment, model 308 does not include a channel for time and model 310 does include a channel for time.

In certain embodiments, corresponding audio 306 (e.g., divided into proper subsets that each correspond to a shot of the shots of video 304) is sent (e.g., in parallel to the video 304 being sent to trained video machine learning models 210) to an audio classification model 312 (e.g., VGG-ish model) trained to extract audio features that indicate a scene change and a voice activity detection model 314 trained to extract (e.g., only) voice features that indicate a scene change.

In certain embodiments, output 316 from one or more trained video machine learning models 210 and/or output 326 from one or more trained audio machine learning models 212 is combined into a single feature vector 336 (e.g., having 13440 elements). In one embodiment, the outputs (e.g., outputs 316 and/or outputs 326) for two consecutive shots are concatenated into a single feature vector, e.g., to determine if the boundary between those two consecutive shots is inferred to be a scene change. In one embodiment, a pair of video feature vectors 318 (e.g., each having 2048 elements) from residual network model 308 for a first shot and a second, consecutive shot are concatenated 320 into a single video feature vector (e.g., having 4096 elements) for a pair of shots (e.g., which may be referred to as a "sample"), a pair of video feature vectors 322 (e.g., each having 2048 elements) from three-dimensional (3D) convolutional neural network model 310 for the first shot and the second, consecutive shot are concatenated 324 into a single video feature vector (e.g., having 4096 elements) for a pair of shots (e.g., which may be referred to as the "sample"), a pair of audio feature vectors 328 (e.g., each having 128 elements) from audio classification model 312 for the first shot and the second, consecutive shot are concatenated 330 into a single audio feature vector (e.g., having 256 elements) for a pair of shots (e.g., which may be referred to as the "sample"), and/or a pair of audio feature vectors 332 (e.g., each having 256 elements) from voice activity detection model 314 for the first shot and the second, consecutive shot are concatenated 334 into a single audio (e.g., only voice) feature vector (e.g., having 512 elements) for a pair of shots (e.g., which may be referred to as the "sample"). In certain embodiments, these outputs 316 from one or more trained video machine learning models 210 and outputs 326 from one or more trained audio machine learning models 212 are combined into the single feature vector 336 (e.g., having 13440 elements).

Optionally, single feature vector (e.g., for each pair of shots) is input into a voice activity detection model 338 (e.g., the same or different than voice activity detection model 314) to further refine if a scene is detected, e.g., be determining if there is voice activity within a threshold (e.g., 0.8 seconds or any other number) amount of time from a candidate for a scene change, e.g., assuming that a scene change will not include voice activity that overlaps that threshold.

In certain embodiments, output of ensemble is a scene change prediction 340, e.g., one prediction for each shot boundary as a likely candidate (or not) as a scene change. The scene change may be identified by a timestamp, e.g., indicating the elapsed time of the title for that scene change. Such scene changes may be used to insert secondary content, e.g., as discussed herein.

There are several challenges to building a system for scene change detection due to the complexity of the problem. First, the training data available that includes scene change labels is sparsely labeled in certain embodiments, e.g., such that the training data cannot arbitrarily be fed into the learning system with no control regarding true negative versus false negative. Second, during feature extraction, the selection of pre-trained models (e.g., networks) in certain embodiments is critical to the system, and the scalability is also important considering the amount of video data to be processed. Third, in embodiments where the definition of a scene changes, some heuristic rules are to be made on the system level to improve the overall performance and robustness. To address these issues, embodiments herein integrate multiple innovating points uniquely designed for these goals.

In certain embodiments of ensemble 112, there are two modalities, four networks, and eight feature vectors extracted for each (e.g., two shot) sample. In one embodiment, instead of only acquiring (e.g., max-pooling based) and utilizing features (e.g., separate feature vectors) for each shot, considering the nature of this problem, a comparison-based approach is used with the concatenation of feature vectors from two adjacent shots in each sample into a single concatenated feature vector, e.g., for each model. These concatenated feature vectors can also be combined into a single feature vector (e.g., feature vector 336 in FIG. 3). In this way, the relationships between shots in each sample can be identified, e.g., to provide better performance and explainability. In certain embodiments, training an ensemble includes shot detection and feature extraction for numerous (e.g., thousands of) titles, and with four separate models, getting from titles to feature vectors may require significant computational resources. For example, if there are 1000 shots in each title and 4000 titles, that is 4 million shots with hundreds of millions of frames. With a plurality of (e.g., five) steps including shot detection and feature extraction for each sample, this may cause processing of millions of steps (e.g., 20 million steps) in total. Even with parallel computation, assuming it takes just one second for each step (but it can take much longer), this may utilize more than 5000 hours (i.e., more than 200 days) to finish the whole procedure once. Setting aside running several times to select the best settings for each step, it is generally not feasible to wait 200 days for one pass. To solve this issue, embodiments herein perform vertical parallel computation on a machine level. That is, for a task that needs one machine to complete in 200 days, embodiments herein launch a plurality of (e.g., 50) machines simultaneously to each run a batch of the task, which would reduce the wait time to fewer days (e.g., 4 days in this example) which may be critical to enable ensemble 112 to progress with training.

Note that voice activity detection may be used in ensemble 112, for example, to better clarify the definition of scene change and improve robustness. In one embodiment, a voice activity detection model (e.g., voice activity detection model 314 and/or voice activity detection model 338) outputs the probability of whether there is someone talking in a selected unit of time (e.g., about 0.8 second) in a clips. Certain embodiments herein utilize voice activity detection for both filtering of training data and during actual scene change detection (e.g., flipping of values based on the presence or not of a voice in a shot, e.g., within a threshold time from an end of the shot). For example, using voice activity detection to filter training data by filtering training samples to eliminate the shots (e.g., samples) with a false positive "voice activity detection" prediction, e.g., to better purify the training set. For example, using voice activity detection (e.g., model 338 in FIG. 3) to filter out false positives generated by the ensemble, e.g., for a positive output indicating a probable scene change, if that sample (e.g., one or more shots thereof) has a positive prediction of voice activity being present in that sample (e.g., the one or more shots thereof), the ensemble is to then flip that to a negative output indicating that sample is not a probable scene change. Certain embodiments thus integrate voice activity detection into scene change detection to improve performance of the scene change detection and to provide cue points with minimal interruption to users, e.g., which can significantly enhance their watching experience.

Training an ensemble 112, e.g., as depicted in FIG. 3, may include providing a training dataset (e.g., training dataset 218 in FIG. 2) with one or more labels that indicate scene changes (e.g., a boundary between two scenes). In one embodiment, a training dataset includes a plurality of (e.g., about 4000) full-length (e.g., movie) titles and labels that indicate scene changes, e.g., where each title is associated with a sequence of timestamps indicating positive cue points. In certain embodiments, the first step is to process the titles with a shot detector (e.g., shot detector 214 in FIGS. 2 and 3) (e.g., shot detector algorithms) to parse each title into a plurality of shot clips. Generally, if all the shots were labeled as either positive (e.g., a scene change occurs, e.g., at the end of that shot) or negative (e.g., a scene change does not occur, e.g., at the end of that shot), that data could be feed into the machine learning system. Unfortunately, it is not the case for numerous datasets. For example, in certain embodiments there are averagely 1000 shots in a full-length title, and, when the ratio between positive and negative cue points is 1:10, there should be 90 positive shots (e.g., cue points) labeled and the rest of the 910 shots are assumed to be negative. However, certain labeled datasets average a much lower number of (e.g., 5) positive shots (e.g., cue points) that are sparsely labeled in each title, and thus the remaining (e.g., 995) shots cannot be considered to be negative. Considering the cost and efficiency of manual curation, it may not be feasible to densely label numerous (e.g., thousands of) titles.

Thus, certain embodiments herein use sparsely labeled datasets for scene change detection. To match positive cue points with shot detection timestamps, certain embodiments herein (e.g., model training service 232 in FIG. 2) check whether there is a shot change point within the range of time (e.g., about two seconds) of a labeled cue point (e.g., scene boundary). If so, the shot change point is selected as the middle point in certain embodiments with one shot from the left of the shot change point (e.g., earlier in title elapsed time) and one shot from the right of the shot change point (e.g., later in title elapsed time) to form a positive sample (e.g., clip). Then, negative samples (e.g., clips) are marked around the positive one with the assumption that two adjacent scene change points would be an average number of (e.g., 10) shots away from each other. That is, for each positive clip matched, a sliding window of two shots with a certain number of (e.g., five) steps to the left, and a certain number of (e.g., five) steps to the right, where each step creates one negative sample consisting of two shots. In this way, the leftmost/rightmost negative clip would be the certain number of (e.g., 5) shots away from the positive clip, which is well under the assumed average number of (e.g., 10) shots adjacency, and thus would provide high quality negative samples under the sparsely labeled scenario.

Figure 4:
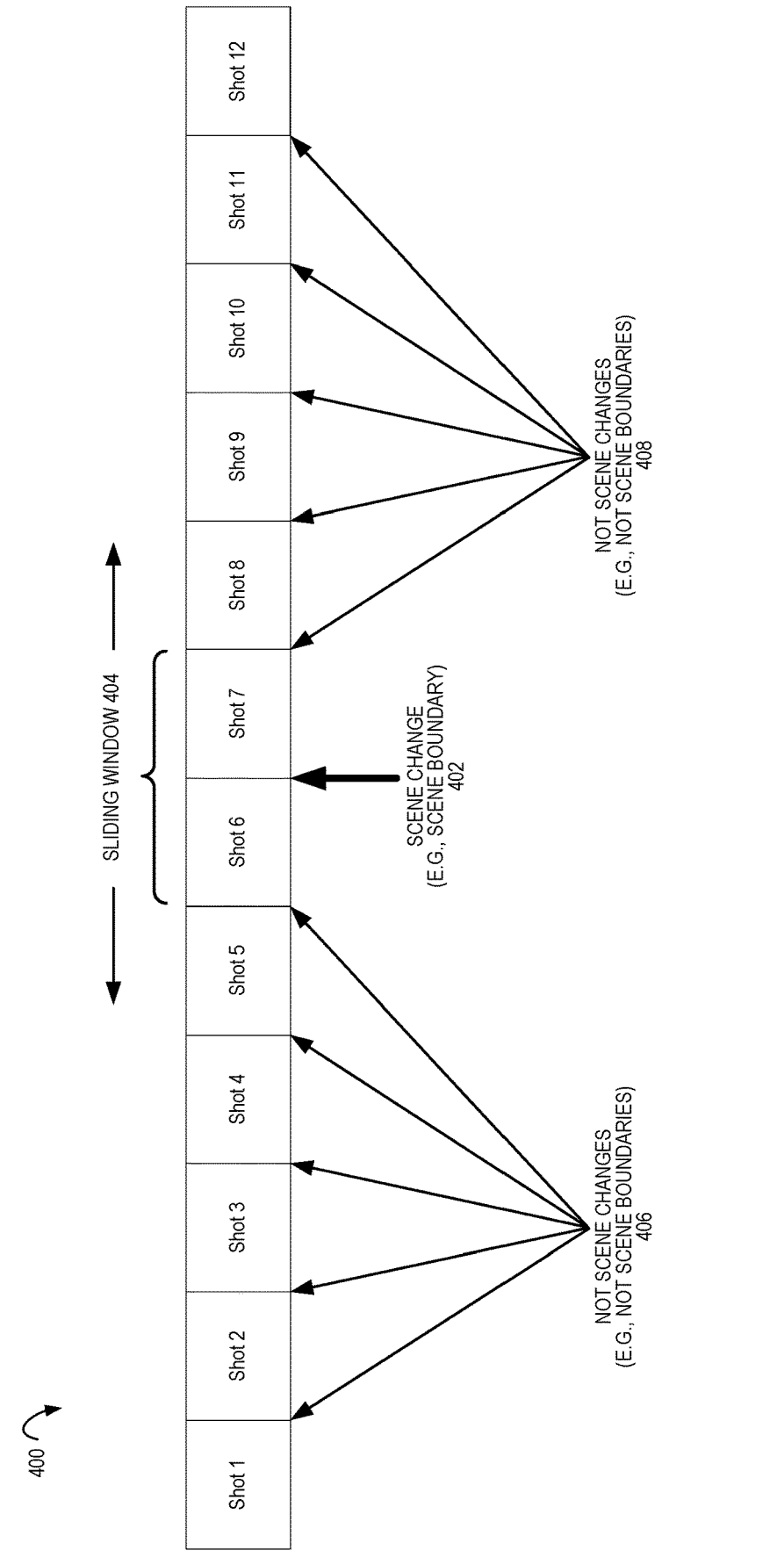
FIG. 4 is a diagram illustrating a plurality of shots of a video having a scene change therein according to some embodiments.

FIG. 4 is a diagram 400 illustrating a plurality of shots of a video having a scene change therein according to some embodiments. Although the plurality of shots are shown as twelve shots, it should be understood that any number of shots may be present in a title (e.g., video). Sliding window 404 can thus be slid a certain number of shots to the left and right (e.g., previously and after, respectively) of scene change 402 (e.g., scene boundary) between shots six and seven as indicated by a label in this (e.g., sparsely labeled) data. Thus, each of the other shot boundaries in this proper subset of (e.g., 12) shots of the title can be marked as (i) "not scene changes" 406 for the previous (e.g., five) shots boundaries before the shot boundary of the scene change 402 (e.g., with the first shot (shot 6) of the scene change 402 marking an end of a first scene) and/or (ii) "not scene changes" 408 for the next five shots after the shot boundary of the scene change 402 (e.g., with the second, later shot (shot 7) of the scene change 402 marking a beginning of a second, next scene).

Certain embodiments herein are directed to novel systems and methods for scene change detection in titles that can generate cue-points automatically based on an ensemble of deep learning models.

FIG. 5 is a flow diagram illustrating operations 500 of a method for training and usage of an ensemble of machine learning models to detect a scene change according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by provider network 200 of the other figures.

The operations 500 include, at block 502, receiving a request to train an ensemble of machine learning models, on a training dataset of videos having labels that indicate scene changes, to detect a scene change in a video. The operations 500 further include, at block 504, partitioning each video file of the training dataset of videos into a plurality of shots. The operations 500 further include, at block 506, training the ensemble of machine learning models into a trained ensemble of machine learning models based at least in part on the plurality of shots of the training dataset of videos and the labels that indicate scene changes. The operations 500 further include, at block 508, receiving an inference request for an input video. The operations 500 further include, at block 510, partitioning the input video into a plurality of shots. The operations 500 further include, at block 512, generating, by the trained ensemble of machine learning models, an inference of one or more scene changes in the input video based at least in part on the plurality of shots of the input video. The operations 500 further include, at block 514, transmitting the inference to a client application or to a storage location.

FIG. 6 is a flow diagram illustrating operations 600 of a method for detecting a scene change with an ensemble of machine learning models according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by provider network 200 of the other figures.

The operations 600 include, at block 602, receiving an inference request to detect one or more scene changes in an input video. The operations 600 further include, at block 604, partitioning the input video into a plurality of shots. The operations 600 further include, at block 606, generating, by an ensemble of machine learning models, an inference of one or more scene changes in the input video based at least in part on the plurality of shots of the input video. The operations 600 further include, at block 608, transmitting the inference to a client application or to a storage location.

Exemplary environments, systems, etc. that the above may be used in are detailed below.

At least some embodiments of the disclosed technologies can be described in view of the following examples:

Example 1. A computer-implemented method comprising:

receiving a request to train an ensemble of machine learning models, on a training dataset of videos having labels that indicate scene changes, to detect a scene change in a video;

partitioning each video file of the training dataset of videos into a plurality of shots;

training the ensemble of machine learning models into a trained ensemble of machine learning models based at least in part on the plurality of shots of the training dataset of videos and the labels that indicate scene changes;

receiving an inference request for an input video;

partitioning the input video into a plurality of shots;

generating, by the trained ensemble of machine learning models, an inference of one or more scene changes in the input video based at least in part on the plurality of shots of the input video; and transmitting the inference to a client application or to a storage location.

Example 2. The computer-implemented method of example 1, wherein the generating the inference comprises:

generating a first feature vector for a first shot of the input video with a video machine learning model of the ensemble of machine learning models;

generating a second feature vector for a second, consecutive shot of the input video with the video machine learning model of the ensemble of machine learning models; and concatenating the first feature vector and the second feature vector into a concatenated feature vector, wherein the inference is based at least in part on the concatenated feature vector.

Example 3. The computer-implemented method of example 1, wherein the generating the inference comprises performing a voice activity detection on corresponding audio for the plurality of shots of the input video to detect voice activity in the corresponding audio for the plurality of shots; and the inference is based at least in part on the voice activity in the corresponding audio for the plurality of shots.

Example 4. A computer-implemented method comprising:

receiving an inference request to detect one or more scene changes in an input video;

partitioning the input video into a plurality of shots;

generating, by an ensemble of machine learning models, an inference of one or more scene changes in the input video based at least in part on the plurality of shots of the input video; and transmitting the inference to a client application or to a storage location.

Example 5. The computer-implemented method of example 4, wherein the generating the inference comprises:

generating a first feature vector for a first shot of the input video with a video machine learning model of the ensemble of machine learning models;

generating a second feature vector for a second, consecutive shot of the input video with the video machine learning model of the ensemble of machine learning models; and concatenating the first feature vector and the second feature vector into a concatenated feature vector, wherein the inference is based at least in part on the concatenated feature vector.

Example 6. The computer-implemented method of example 5, wherein the generating the inference comprises:

generating a third feature vector for a third, consecutive shot of the input video with the video machine learning model of the ensemble of machine learning models; and concatenating the second feature vector and the third feature vector into a second concatenated feature vector, wherein the inference is based at least in part on the concatenated feature vector and the second concatenated feature vector.

Example 7. The computer-implemented method of example 4, wherein the generating the inference comprises:

generating a first feature vector for a first shot of the input video with a first video machine learning model of the ensemble of machine learning models;

generating a second feature vector for a second, consecutive shot of the input video with the first video machine learning model of the ensemble of machine learning models;

generating a third feature vector for the first shot of the input video with a second, different video machine learning model of the ensemble of machine learning models;

generating a fourth feature vector for the second, consecutive shot of the input video with the second, different video machine learning model of the ensemble of machine learning models; and concatenating the first feature vector and the second feature vector into a first concatenated feature vector, and the third feature vector and the fourth feature vector into a second concatenated feature vector, wherein the inference is based at least in part on the first concatenated feature vector and the second concatenated feature vector.

Example 8. The computer-implemented method of example 7, wherein the generating the inference further comprises forming a single feature vector from the first concatenated feature vector and the second concatenated feature vector, wherein the inference is based at least in part on the single feature vector.

Example 9. The computer-implemented method of example 4, wherein the generating the inference comprises performing a voice activity detection on corresponding audio for the plurality of shots of the input video to detect voice activity in the corresponding audio for the plurality of shots; and the inference is based at least in part on the voice activity in the corresponding audio for the plurality of shots.

Example 10. The computer-implemented method of example 4, wherein the ensemble of machine learning models comprises a plurality of video machine learning models and a plurality of audio machine learning models.

Example 11. The computer-implemented method of example 4, further comprising:

receiving a request to train the ensemble of machine learning models on a training dataset comprising a video having a label that indicates a scene change;

partitioning the video of the training dataset into a plurality of shots;

generating labels to mark a plurality of shot boundaries, that are adjacent to a shot boundary of the scene change, as not scene changes; and training the ensemble of machine learning models based at least in part on the plurality of shots of the video of the training dataset, the label that indicates the scene change, and the labels that mark the plurality of shot boundaries, that are adjacent to the shot boundary of the scene change, as not scene changes.

Example 12. The computer-implemented method of example 4, further comprising:

receiving a request to train the ensemble of machine learning models on a training dataset comprising a video and corresponding audio;

partitioning the video of the training dataset into a plurality of shots;

performing a voice activity detection on the corresponding audio for the plurality of shots of the video of the training dataset to detect voice activity in the corresponding audio for the plurality of shots;

generating a label to mark a shot boundary as not a scene change based on the voice activity being detected in at least one of the shots forming the shot boundary; and training the ensemble of machine learning models based at least in part on the label.

Example 13. The computer-implemented method of example 4, further comprising inserting secondary content into the input video at a shot boundary indicated by the inference as a scene change to generate an output video.

Example 14. The computer-implemented method of example 13, further comprising:

receiving a request for the output video from a client device; and sending the output video to the client device.

Example 15. A system comprising:

a content data store to store an input video; and a machine learning service implemented by a one or more electronic devices, the machine learning service including instructions that upon execution cause the one or more electronic devices to perform operations comprising:

receiving an inference request to detect one or more scene changes in the input video, partitioning the input video into a plurality of shots, generating, by an ensemble of machine learning models, an inference of one or more scene changes in the input video based at least in part on the plurality of shots of the input video, and transmitting the inference to a client application or to a storage location.

Example 16. The system of example 15, wherein the generating the inference comprises:

generating a first feature vector for a first shot of the input video with a video machine learning model of the ensemble of machine learning models;

generating a second feature vector for a second, consecutive shot of the input video with the video machine learning model of the ensemble of machine learning models; and concatenating the first feature vector and the second feature vector into a concatenated feature vector, wherein the inference is based at least in part on the concatenated feature vector.

Example 17. The system of example 16, wherein the generating the inference comprises:

generating a third feature vector for a third, consecutive shot of the input video with the video machine learning model of the ensemble of machine learning models; and concatenating the second feature vector and the third feature vector into a second concatenated feature vector, wherein the inference is based at least in part on the concatenated feature vector and the second concatenated feature vector.

Example 18. The system of example 15, wherein the generating the inference comprises performing a voice activity detection on corresponding audio for the plurality of shots of the input video to detect voice activity in the corresponding audio for the plurality of shots; and the inference is based at least in part on the voice activity in the corresponding audio for the plurality of shots.

Example 19. The system of example 15, wherein the ensemble of machine learning models comprises a plurality of video machine learning models and a plurality of audio machine learning models.

Example 20. The system of example 15, wherein the machine learning service further includes instructions that upon execution cause the one or more electronic devices to perform operations comprising inserting secondary content into the input video at a shot boundary indicated by the inference as a scene change to generate an output video.

Figure 7:
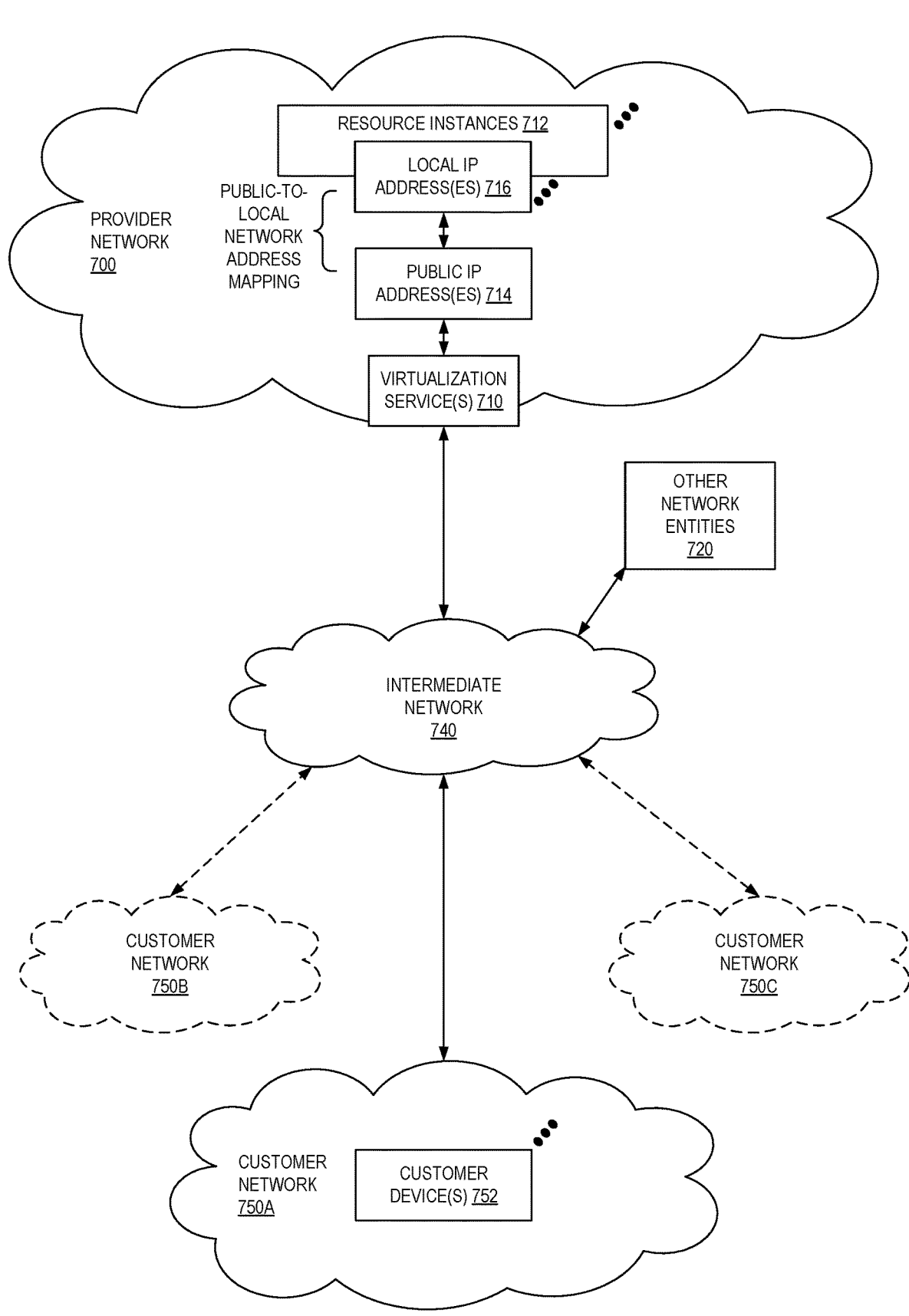
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
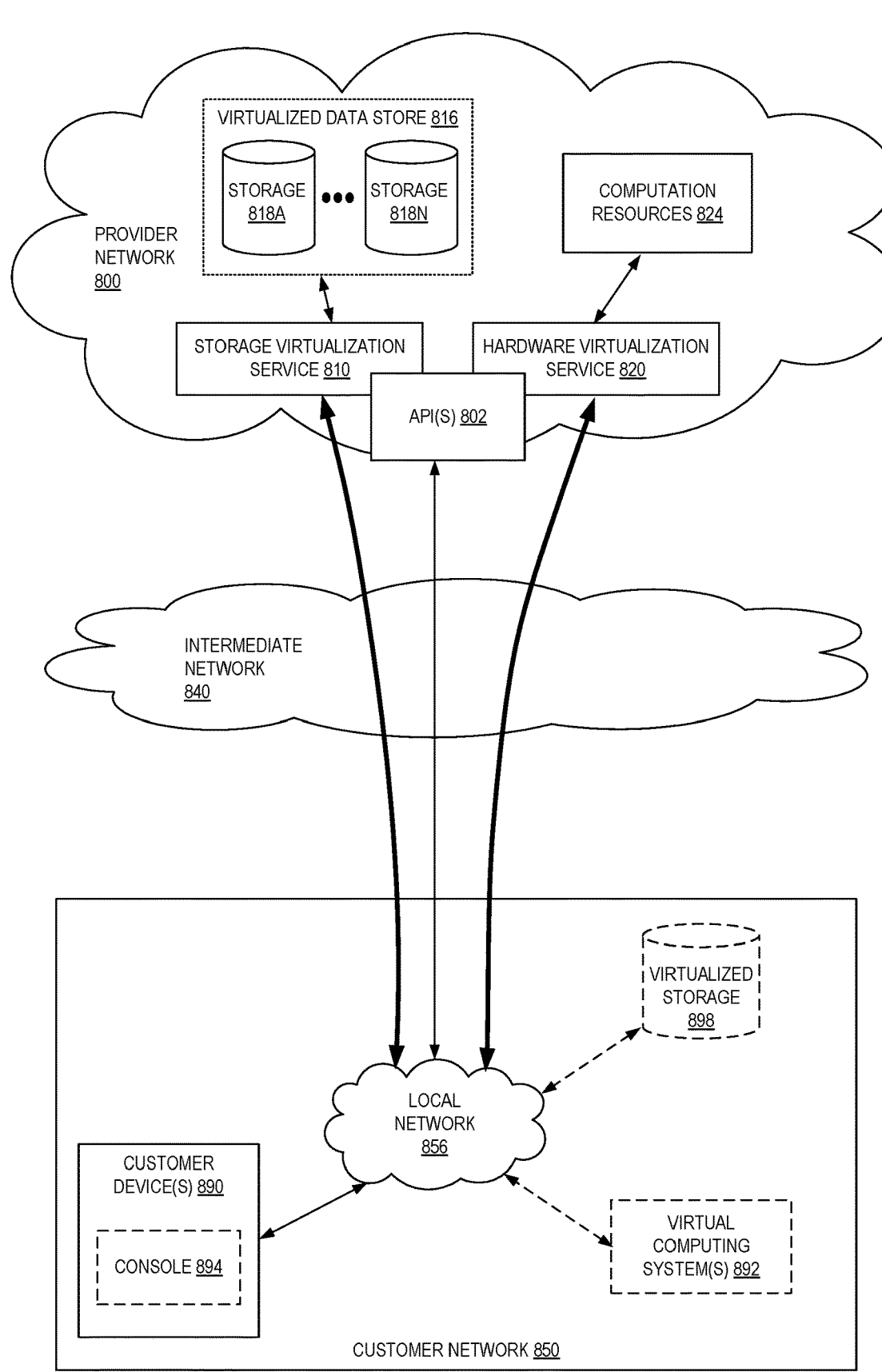
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

Figure 9:
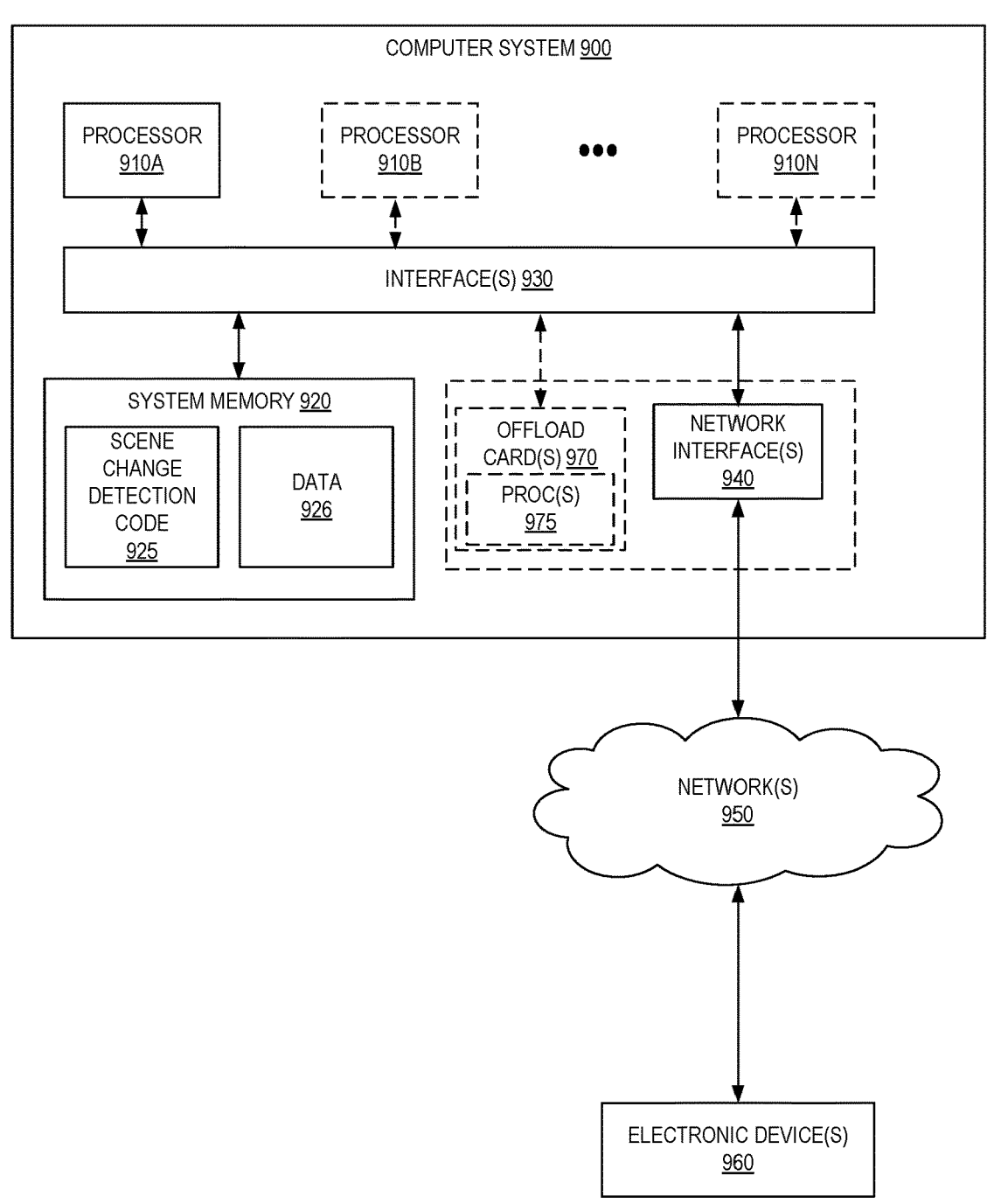
FIG. 9 is a block diagram illustrating an example computer system that may be used in some embodiments.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.
Illustrative System In some embodiments, a system that implements a portion or all of the techniques for content indexing as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as scene change detection code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Figure 10:
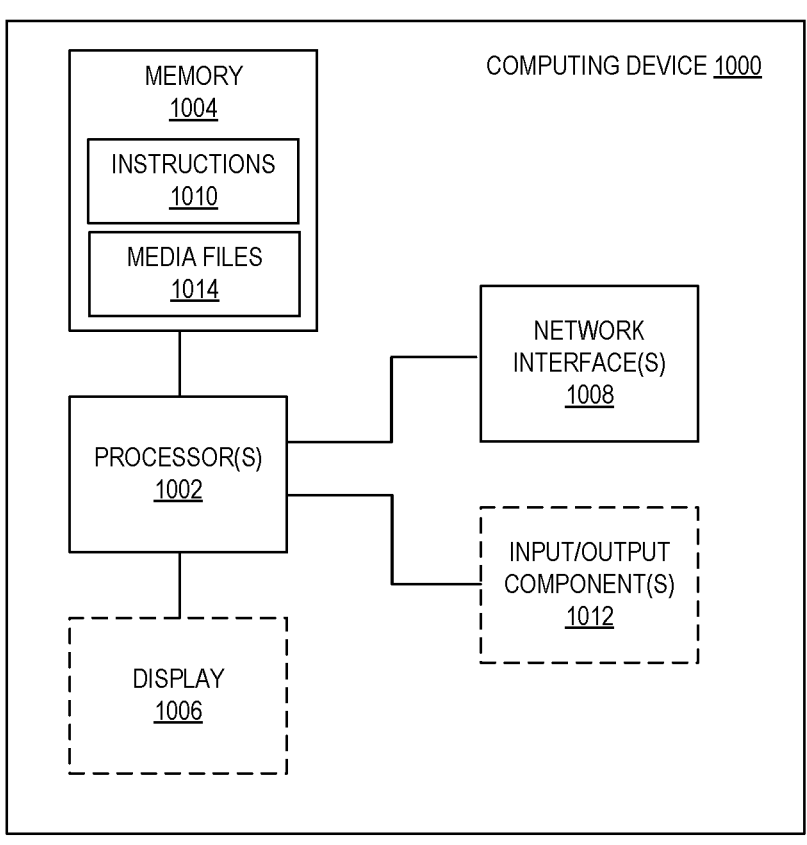
FIG. 10 illustrates a logical arrangement of a set of general components of an exemplary computing device that can be utilized in accordance with various embodiments.

FIG. 10 illustrates a logical arrangement of a set of general components of an example computing device 1000. Generally, a computing device 1000 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1002 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1004) to store code (for example, instructions 1010, e.g., which implement a scene change detector as disclosed herein) and/or media files 1014 (e.g., generated by packaging service 124 in FIG. 1), and a set of one or more wired or wireless network interfaces 1008 allowing the electronic device to transmit data to and receive data from other computing devices, typically across one or more networks (e.g., Local Area Networks (LANs), the Internet). For example, where computing device 1000 is an instance of client device 128 in FIG. 1, e.g., and is coupled via network interface(s) 1008 to content delivery system 102 in FIG. 1. The coupling of the set of processors and other components is typically through one or more interconnects within the electronic device, (e.g., busses and possibly bridges). Thus, the non-transitory machine-readable storage media (e.g., memory 1004) of a given electronic device typically stores code (e.g., instructions 1010) for execution on the set of one or more processors 1002 of that electronic device. One or more parts of various embodiments may be implemented using different combinations of software, firmware, and/or hardware.

A computing device 1000 can include some type of display element 1006, such as a touch screen or liquid crystal display (LCD), although many devices such as portable media players might convey information via other means, such as through audio speakers, and other types of devices such as server end stations may not have a display element 1006 at all. As discussed, some computing devices used in some embodiments include at least one input and/or output component(s) 1012 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 11:
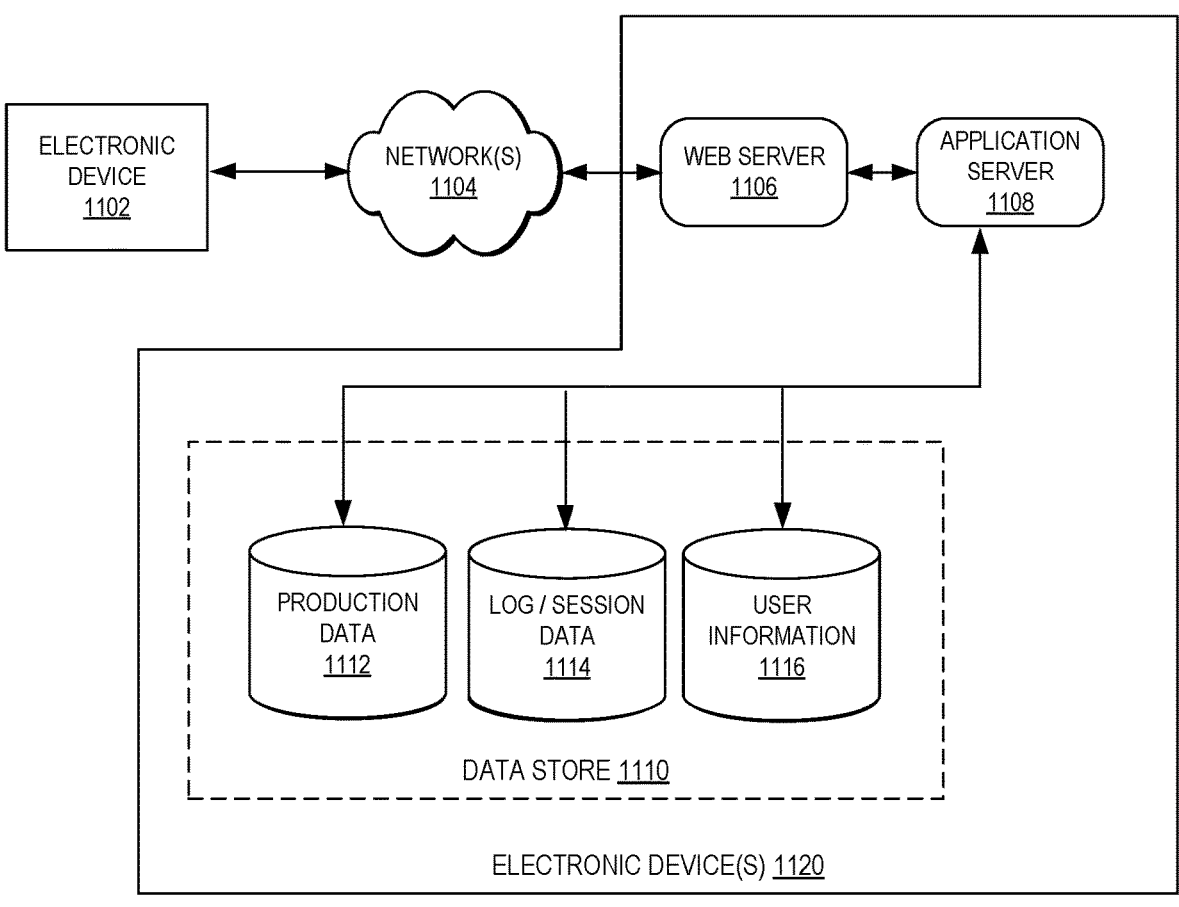
FIG. 11 illustrates an example of an environment for implementing aspects in accordance with various embodiments.

As discussed, different approaches can be implemented in various environments in accordance with the described embodiments. For example, FIG. 11 illustrates an example of an environment 1100 for implementing aspects in accordance with various embodiments. For example, in some embodiments messages are HyperText Transfer Protocol (HTTP) requests that are received by a web server (e.g., web server 1106), and the users, via electronic devices, may interact with the provider network via a web portal provided via the web server 1106 and application server 1108. As will be appreciated, although a web-based environment is used for purposes of explanation, different environments may be used, as appropriate, to implement various embodiments. The system includes an electronic client device 1102, which may also be referred to as a client device and can be any appropriate device operable to send and receive requests, messages or information over an appropriate network 1104 and convey information back to a user of the device 1102. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1104 includes the Internet, as the environment includes a web server 1106 for receiving requests and serving content in response thereto, although for other networks an alternative device serving a similar purpose could be used, as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device 1102 and handling a majority of the data access and business logic for an application. The application server 1108 provides access control services in cooperation with the data store 1110 and is able to generate content such as text, graphics, audio, video, etc., to be transferred to the client device 1102, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1102 and the application server 1108, can be handled by the web server 1106. It should be understood that the web server 1106 and application server 1108 are not required and are merely example components, as structured code discussed herein can be executed on any appropriate device or host machine as discussed elsewhere herein.

The data store 1110 can include several separate data tables, databases, or other data storage mechanisms and media for storing data relating to a particular aspect. For example, the data store illustrated includes mechanisms for storing production data 1112 and user information 1116, which can be used to serve content for the production side. The data store 1110 also is shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. In one example, a user might submit a search request for a certain type of item. In this case, the data store 1110 might access the user information 1116 to verify the identity of the user and can access a production data 1112 to obtain information about items of that type. The information can then be returned to the user, such as in a listing of results on a web page that the user is able to view via a browser on the user device 1102. Information for a particular item of interest can be viewed in a dedicated page or window of the browser.

The web server 1106, application server 1108, and/or data store 1110 may be implemented by one or more electronic devices 1120, which can also be referred to as electronic server devices or server end stations, and may or may not be located in different geographic locations. Each of the one or more electronic devices 1120 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:

training a machine learning model, on a training dataset of scene change data, to predict when a shot of a video is an end of a scene in the video;

generating, by the trained machine learning model based on an input of shot representations of a plurality of shots of an input video, a prediction that a shot of the plurality of shots is an end of a scene in the input video;

inserting secondary content into the input video at a shot boundary of the shot indicated by the prediction as the end of the scene to generate an output video; and transmitting the output video to an application or to a storage location.

2. The computer-implemented method of claim 1, wherein the shot representations of the plurality of shots of the input video comprise audio features and video features.

3. The computer-implemented method of claim 2, further comprising concatenating the audio features and the video features into a multimodal shot representation, wherein the input of the trained machine learning model comprises the multimodal shot representation.

4. The computer-implemented method of claim 2, further comprising extracting voice features from corresponding audio of the input video.

5. The computer-implemented method of claim 2, wherein the trained machine learning model comprises a video machine learning model that inputs the audio features of the input video, and an audio machine learning model that inputs the video features of the input video.

6. The computer-implemented method of claim 1, wherein the training dataset comprises a timestamp for a training video.

7. The computer-implemented method of claim 1, wherein the shot predicted to be the end of the scene is the end of a first scene that is followed by a second different scene in the input video.

8. The computer-implemented method of claim 1, wherein the scene in the input video is a set of shots filming action in a same time and location.

9. The computer-implemented method of claim 1, further comprising:

receiving a request for the output video from a client device; and sending the output video to the client device.

10. A non-transitory computer-readable medium storing code that, when executed by a device, causes the device to perform a method comprising:

training a machine learning model, on a training dataset of scene change data, to predict when a shot of a video is an end of a scene in the video;

generating, by the trained machine learning model based on an input of shot representations of a plurality of shots of an input video, a prediction that a shot of the plurality of shots is an end of a scene in the input video;

inserting secondary content into the input video at a shot boundary of the shot indicated by the prediction as the end of the scene to generate an output video; and transmitting the output video to an application or to a storage location.

11. The non-transitory computer-readable medium of claim 10, wherein the shot representations of the plurality of shots of the input video comprise audio features and video features.

12. The non-transitory computer-readable medium of claim 11, wherein the method further comprises concatenating the audio features and the video features into a multimodal shot representation, wherein the input of the trained machine learning model comprises the multimodal shot representation.

13. The non-transitory computer-readable medium of claim 11, wherein the method further comprises extracting voice features from corresponding audio of the input video.

14. The non-transitory computer-readable medium of claim 11, wherein the trained machine learning model comprises a video machine learning model that inputs the audio features of the input video, and an audio machine learning model that inputs the video features of the input video.

15. The non-transitory computer-readable medium of claim 10, wherein the training dataset comprises a timestamp for a training video.

16. The non-transitory computer-readable medium of claim 10, wherein the shot predicted to be the end of the scene is the end of a first scene that is followed by a second different scene in the input video.

17. The non-transitory computer-readable medium of claim 10, wherein the scene in the input video is a set of shots filming action in a same time and location.

18. The non-transitory computer-readable medium of claim 10, wherein the method further comprises:

receiving a request for the output video from a client device; and sending the output video to the client device.

* * * * *